April 16, 1968     P. A. COIA ET AL     3,377,855

NOISE NULLING NETWORK FOR MAGNETIC FLOWMETER

Filed June 29, 1966

INVENTORS
PASCO A. COIA
QUENTIN C. TURTLE

BY *Dodge and Sons*

ATTORNEYS

United States Patent Office 3,377,855
Patented Apr. 16, 1968

3,377,855
NOISE NULLING NETWORK FOR
MAGNETIC FLOWMETER
Pasco A. Coia, Providence, and Quentin C. Turtle, Cranston, R.I., assignors to General Signal Corporation, a corporation of New Jersey
Filed June 29, 1966, Ser. No. 561,619
8 Claims. (Cl. 73—194)

This invention relates to AC electromagnetic flowmeters, and particularly to schemes for nulling the noise generated in the primary element of such a meter.

Meters of this type are used to measure the rate of flow of electrically conductive fluids, particularly liquids, through non-magnetic pipes or conduits. The primary metering element includes an electromagnet, which is arranged to establish an alternating magnetic field which passes through a portion of the pipe in a direction normal to the direction of flow, and a pair of electrodes which are located at diametrically opposite sides of the pipe on an axis perpendicular to both the direction of flow and the direction of the magnetic field. The electrodes are in electrical contact with the fluid and sense the potential induced in the fluid by the magnetic field. A pair of leads connects the electrodes with the secondary element, which usually includes an amplifier and either a readout or a control mechanism.

The output voltage of the primary metering element includes the desired signal, which varies linearly in magnitude with the rate of flow, and noise, which is composed of spurious voltages induced in the leads and in the conductive fluid by the magnetic field. The undesired noise voltage can be of the same order of magnitude as the flow signal or even greater and, since it has a magnitude in the microvolt or millivolt range, it usually cannot be eliminated or even reduced to acceptable limits by use of shielding or special assembly techniques. Therefore, most commercially acceptable meter designs require some means for counteracting or nulling the noise. The most common form of nulling scheme includes means for generating a noise-bucking voltage, which varies with either the magnetization current or voltage, and which is introduced into the secondary in opposition to the noise signal. This proposal is undesirable first, because the circuitry required to produce a bucking voltage having the necessary phase and magnitude is complex and expensive, second, because the secondary must be matched to the primary by calibration, and this is inconvenient if not impractical when several primaries are served selectively by a single secondary, and third, because the primary and secondary in some designs must be connected by additional leads which further increase the risk of picking-up stray signals. While these disadvantages can be eliminated by nulling the noise signal in the primary, the prior schemes of this type of which we are aware are inadequate because they null only the component of the noise signal generated in the fluid itself and leave undiminished the remaining components.

The object of the present invention is to provide a noise-nulling scheme for an AC electromagnetic flowmeter which counteracts the noise signal entirely within the primary metering element, and which is effective to counteract the total noise signal and not just one or several of its components. Furthermore, in the improved scheme the bucking voltage is generated directly by the magnetic field of the primary element, and therefore it not only inherently nulls the noise over the whole range of line voltage fluctuations encountered in normal installations, but is able to do so to a greater degree than any other scheme with which we are acquainted.

The preferred embodiment, and several alternatives, are described herein with reference to the accompanying drawing in which.

Figure 1:
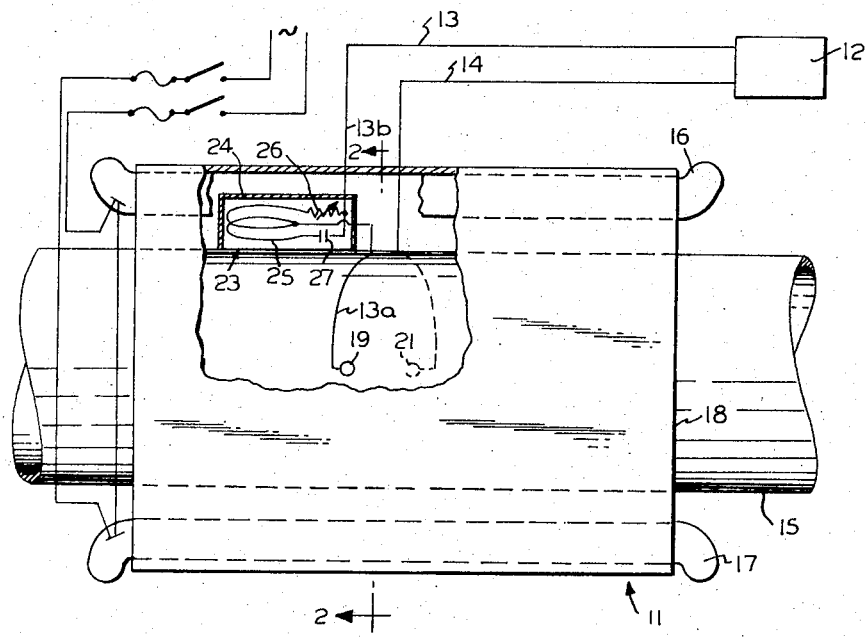
FIG. 1 is an elevational view, in schematic form, of a typical flowmeter incorporating the invention.
Figure 2:
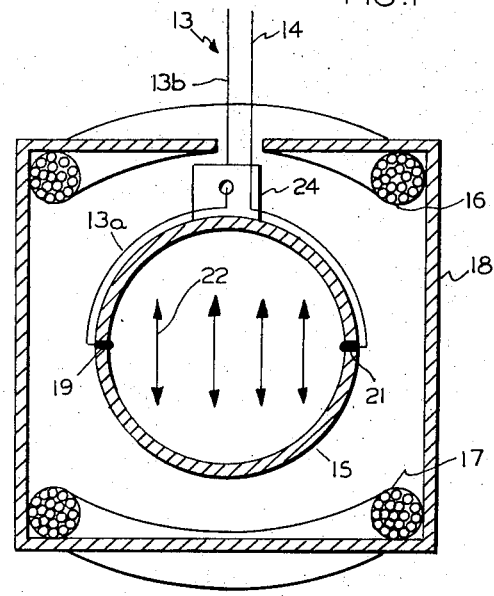
FIG. 2 is a sectional view taken on line 2—2 of FIG. 1.

As shown in the drawing, the flowmeter comprises primary and secondary metering elements 11 and 12, respectively, which are interconnected by a pair of leads 13 and 14, that form part of a shielded cable (not shown), and is arranged to measure the rate of flow of water through pipe 15. The primary metering element 11 includes a pair of field coils 16 and 17 which are connected in series, as shown, or in parallel, a laminated iron core 18 which encircles the pipe 15, and a pair of diametrically opposed electrodes 19 and 21 which are in electrical contact with the water flowing through pipe 15. The portion of pipe 15 in the region of the primary is made of a non-magnetic material. If this pipe material is a conductor of electricity, means must be provided for insulating the electrodes 19 and 21 from the pipe, and the inner surface of the pipe must have an insulating coating or lining on the area affected by the magnetic field. The field coils are connected with a source of alternating current through suitable switches and fuses and establish an alternating magnetic field 22 (see FIG. 2) which is normal to the direction of flow through pipe 15. Electrodes 19 and 21 are located on an axis which is perpendicular to both the field 22 and the direction of flow. Secondary metering element 12 is equipped with an amplifier, and preferably a differential amplifier, which is connected with leads 13 and 14 and whose output is utilized to operate recording, indicating or control mechanism.

Interposed in lead 13 is the noise-nulling network 23 provided by the present invention. This network, which is located in a non-metallic container 24 fixed to the top of pipe 15, includes a tapped coil 25 having at least one loop whose opposite ends are joined by a circuit containing series-connected variable resistor 26 and reactor 27. Portion 13a of lead 13 is connected to the tap of coil 25, and the remaining portion 13b is connected with the circuit at a point between resistor 26 and reactor 27. While reactor 27 can be either a capacitor or an inductor, the former is preferred, and is illustrated, because it is smaller and less expensive and does not include the iron component and multiple turns of wire which characterize an inductor and which themselves could be a source of noise pick-up. Coil 25 preferably is center tapped, but this is not an essential requirement because the two sections of the coil can be oriented differently with respect to the magnetic field 22 in order to equalize the voltages between the tap and the ends of the coil. Moreover, in cases where this approach is undesirable, the circuit interconnecting the ends of the coil can be provided with additional components that will compensate for any imbalance in the voltages between the tap and the ends of the coil attributable to an asymmetric location of the tap.

Figure 3:
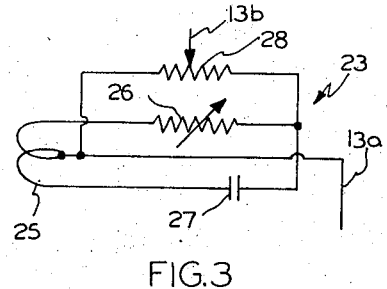
FIG. 3 is a schematic circuit diagram showing an alternative scheme for varying the magnitude of the nulling voltage.

The network 23 introduces directly into the signal circuit a nulling voltage which is substantially 180° out of phase with the noise component of the signal voltage in leads 13 and 14, and which has the magnitude required to counteract the noise. The relative magnitudes of the nulling and noise voltages are varied by changing the orientation of coil 25 or leads 13a and 14 with respect to field 22, so that these conductors are cut by a greater or smaller portion of the magnetic flux, or by use of the voltage divider 28 shown in FIG. 3. The phase of the nulling voltage can be varied through an angle of substantially ±180°, so that this voltage directly opposes the noise voltage, by adjusting resistor 26 and interchanging the connections either to lead portions 13a and 13b or to the end taps of coil 25. This wide range of phase control is an important feature because the phase of the noise voltage varies greatly from meter to meter as a result of distortions in the magnetic field caused by non-ideal core and circuit characteristics. The magnitude and phase adjustments are made while the meter is energized and the liquid in pipe 15 is at rest, and are continued until the no-flow output voltage across leads 13 and 14 is reduced to an acceptable level. After this initial adjustment, which usually would be done during assembly of the primary element, the components are fixed in place and normally require no further attention. It will be noted that since the magnetic field 22 itself is used to generate the nulling voltage, the network 23 inherently takes into account changes in the line voltage supplied to field coils 16 and 17, and is capable of closely matching the nulling voltage to the noise voltage produced by the magnetic field.

In the normal case, only one of the leads 13 and 14 need be provided with a nulling network 23. However, in some cases each lead may require a nulling network 23 to produce reasonable correspondence of the capacitance-to-ground characteristics of the two leads.

The attached drawing and the foregoing description are presented primarily to illustrate the principles of the invention and its presently preferred embodiment. Since many changes can be made in the structures of the disclosed embodiments without departing from the inventive concept, the following claims should provide the sole measure of the scope of the invention.

What we claim is:
1. In an AC electromagnetic flowmeter for use in measuring the rate of flow through a conduit and including means for establishing an alternating magnetic field through a portion of said conduit, a pair of electrodes electrically connected with the fluid flowing through the conduit and arranged to detect an AC potential induced in the fluid, and a pair of leads connected with the electrodes and arranged to apply said potential to a secondary instrument, the improvement which comprises a noise-nulling network interposed in at least one of said leads and dividing said lead into two portions, said network comprising
   (a) a tapped coil having at least one loop and located in said magnetic field so that it has induced in it a voltage which varies with the strength of that field; and
   (b) a circuit interconnecting the opposite ends of the coil and containing a series-connected reactor and variable resistor;
   (c) the two portions of said lead being connected, respectively, with the tap of the coil and with said circuit at a point between the reactor and the resistor.

2. The improvement defined in claim 1 wherein the reactor is a capacitor.

3. The improvement defined in claim 2 wherein the coil is so tapped that the voltages between the tap and the ends of the coil are substantially equal.

4. The improvement defined in claim 3 wherein the coil is center tapped.

5. The improvement defined in claim 1 which includes an adjustable voltage-dividing resistor having
   (a) a resistance element which interconnects the coil tap with a point in said circuit between the variable resistor and the reactor; and
   (b) a movable tap connected with one of said lead portions,
   (c) the tap and a portion of the resistance element serving as the connection between said one lead portion and the network.

6. The improvement defined in claim 5 wherein the reactor is a capacitor.

7. The improvement defined in claim 6 wherein the coil is so tapped that the voltages between the tap and the ends of the coil are substantially equal.

8. The improvement defined in claim 7 wherein the coil is center tapped.

References Cited
UNITED STATES PATENTS 3,359,410  9/1967  Stern _____ 73—194

OTHER REFERENCES

Kolin: The Review of Scientic Instrument, vol. 16, No. 5, May 1945, pp. 109–116, copy in 73–194.

RICHARD C. QUEISSER, *Primary Examiner.*

CHARLES A. RUEHL, *Assistant Examiner.*

UNITED STATES PATENT OFFICE
CERTIFICATE OF CORRECTION

Patent No. 3,377,855

April 16, 1968

Pasco A. Coia et al.

It is certified that error appears in the above identified patent and that said Letters Patent are hereby corrected as shown below:

In the heading to the printed specification, lines 5 and 6, "assignors to General Signal Corporation, a corporation of New Jersey" should read -- assignors to General Signal Corporation, a corporation of New York --.

Signed and sealed this 19th day of August 1969.

(SEAL)
Attest:

Edward M. Fletcher, Jr.
Attesting Officer

WILLIAM E. SCHUYLER, JR.
Commissioner of Patents